(No Model.)  6 Sheets—Sheet 1.
W. L. HORNE.
CASH INDICATOR, REGISTER, AND RECORDER.
No. 308,259.  Patented Nov. 18, 1884.

Witnesses:
A. M. Long.
E. T. Walker.

Inventor.
William L. Horne
by his attorney (No Model.)
6 Sheets—Sheet 2.

W. L. HORNE.
CASH INDICATOR, REGISTER, AND RECORDER.

No. 308,259. Patented Nov. 18, 1884.

Witnesses:
A. M. Long.
E. P. Walker.

Inventor.
William L. Horne
by his attorney (No Model.) W. L. HORNE. 6 Sheets—Sheet 3.
CASH INDICATOR, REGISTER, AND RECORDER.
No. 308,259. Patented Nov. 18, 1884.

Witnesses:
A. M. Long.
E. F. Walker

Inventor.
William L. Horne
by his attorney (No Model.) W. L. HORNE. 6 Sheets—Sheet 4.
CASH INDICATOR, REGISTER, AND RECORDER.
No. 308,259. Patented Nov. 18, 1884.
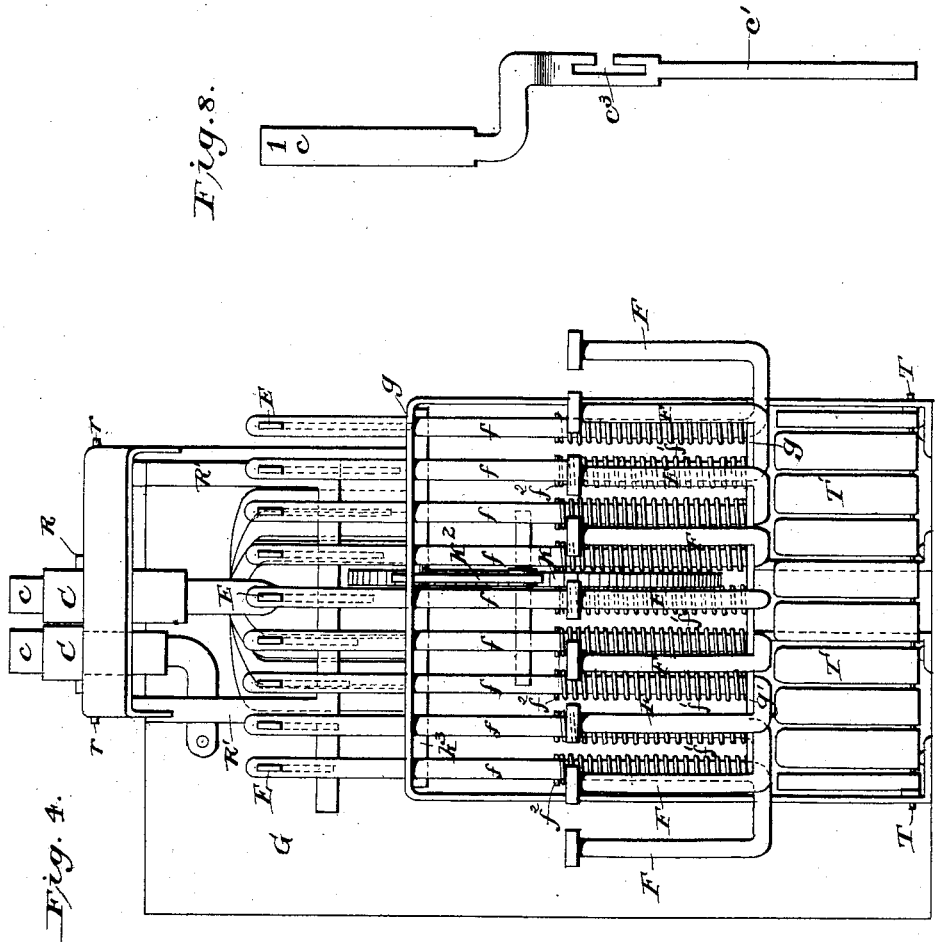

(No Model.) 6 Sheets—Sheet 5.
W. L. HORNE.
CASH INDICATOR, REGISTER, AND RECORDER.
No. 308,259. Patented Nov. 18, 1884.
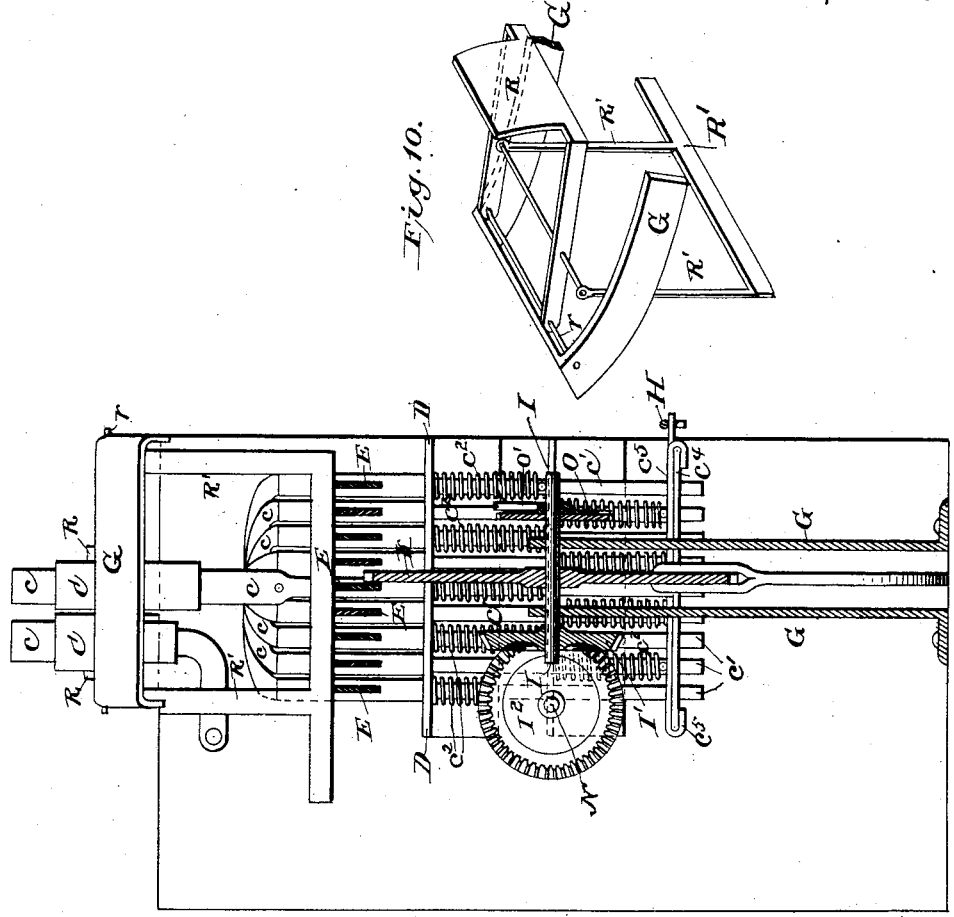
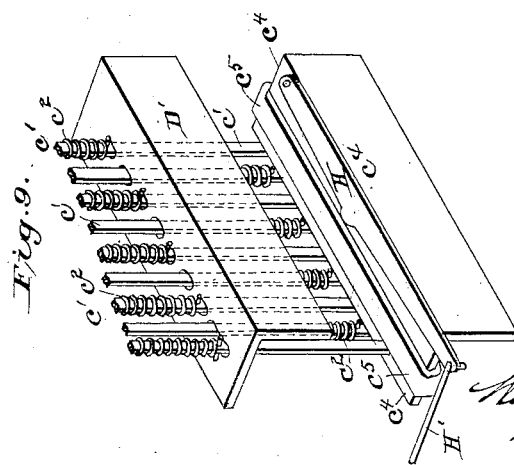

(No Model.)  6 Sheets—Sheet 6.
W. L. HORNE.
CASH INDICATOR, REGISTER, AND RECORDER.
No. 308,259. Patented Nov. 18, 1884.
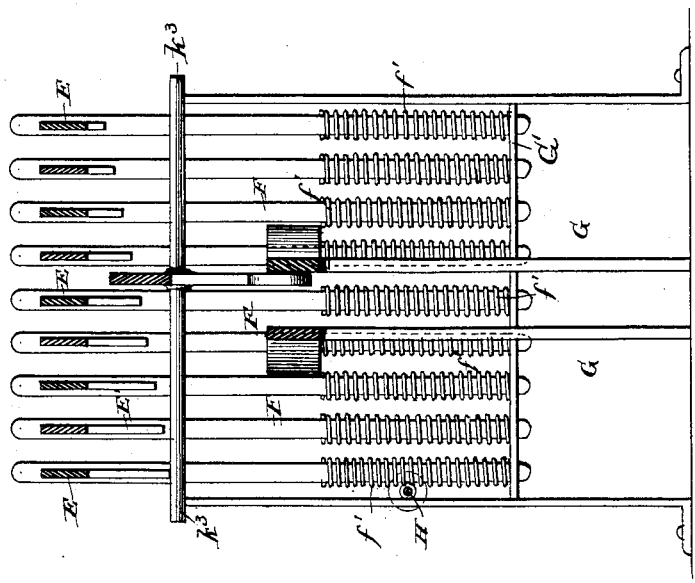
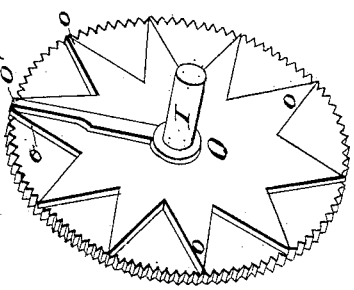
Witnesses:
A. M. Long.
E. T. Walker.
Inventor.
William L. Horne
by his attorney

UNITED STATES PATENT OFFICE.

WILLIAM L. HORNE, OF MERIDEN, CONNECTICUT.

CASH INDICATOR, REGISTER, AND RECORDER.

SPECIFICATION forming part of Letters Patent No. 308,259, dated November 18, 1884.

Application filed October 11, 1882. (No model.)

*To all whom it may concern:*

Be it known that I, WILLIAM L. HORNE, a citizen of the United States, residing at Meriden, in the county of New Haven and State of Connecticut, have invented certain new and useful Improvements in Cash-Receipts Indicators and Recorders; and I do hereby declare the following to be a full, clear, and exact description of the invention, such as will enable others skilled in the art to which it appertains to make and use the same.

This invention consists of a machine designed to indicate and account for cash receipts at banks, counting-houses, stores, hotels, bar-rooms, &c., it being provided with mechanism for indicating each payment by a display of figures representing the amount, and also with a recording mechanism, or with a registering mechanism, or with both a recording mechanism and a registering mechanism, according as it may be designed to record the receipts, or to register the receipts, or to both record and register the receipts.

In order that my invention may be clearly understood, I have illustrated in the annexed drawings, and will proceed to describe, a practical form of a machine which indicates each payment and both records and registers the receipts.

The combinations constituting my invention are specifically pointed out in the claims at the close of this specification.

Figure 1:
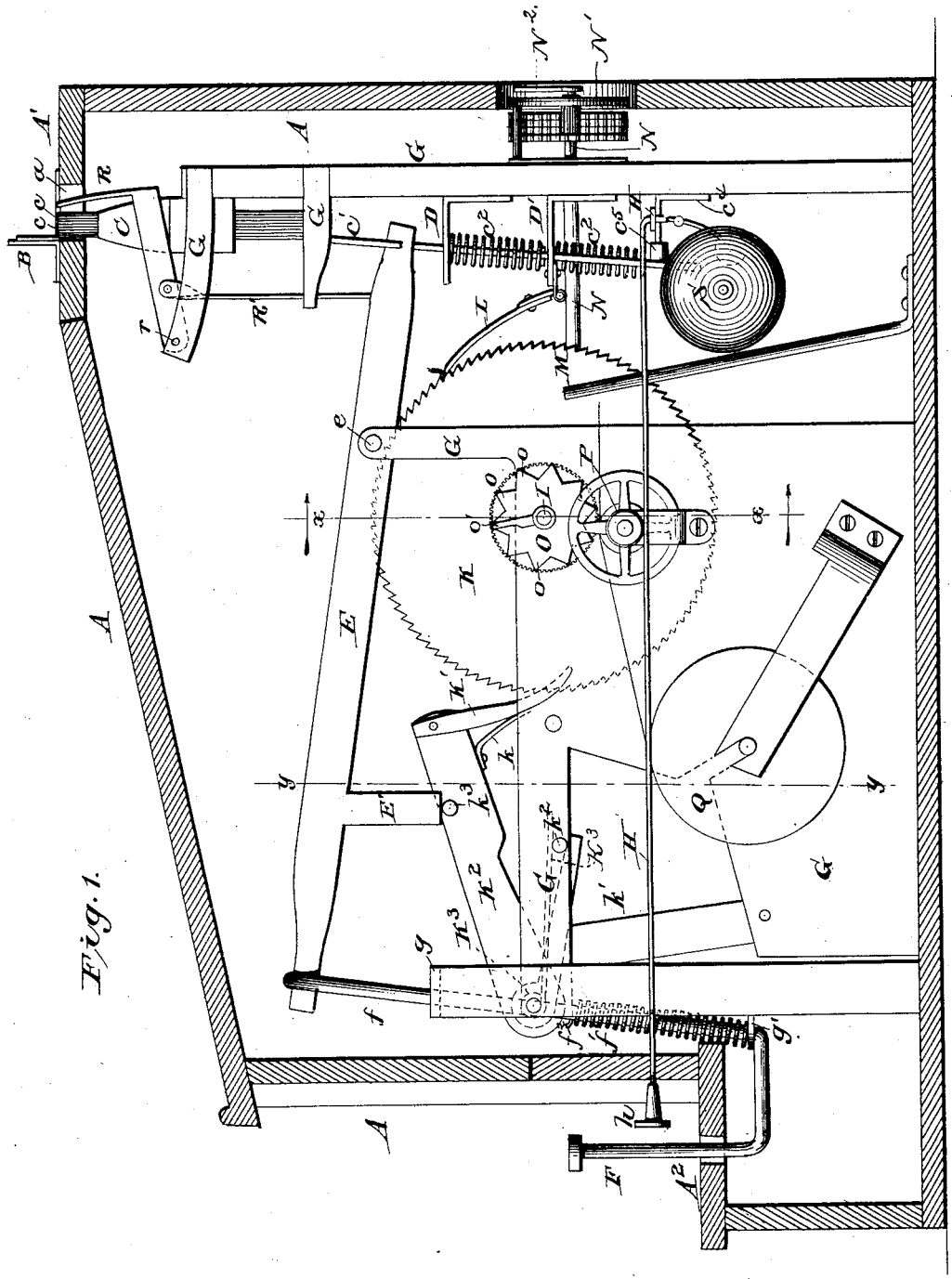
Figure 2:
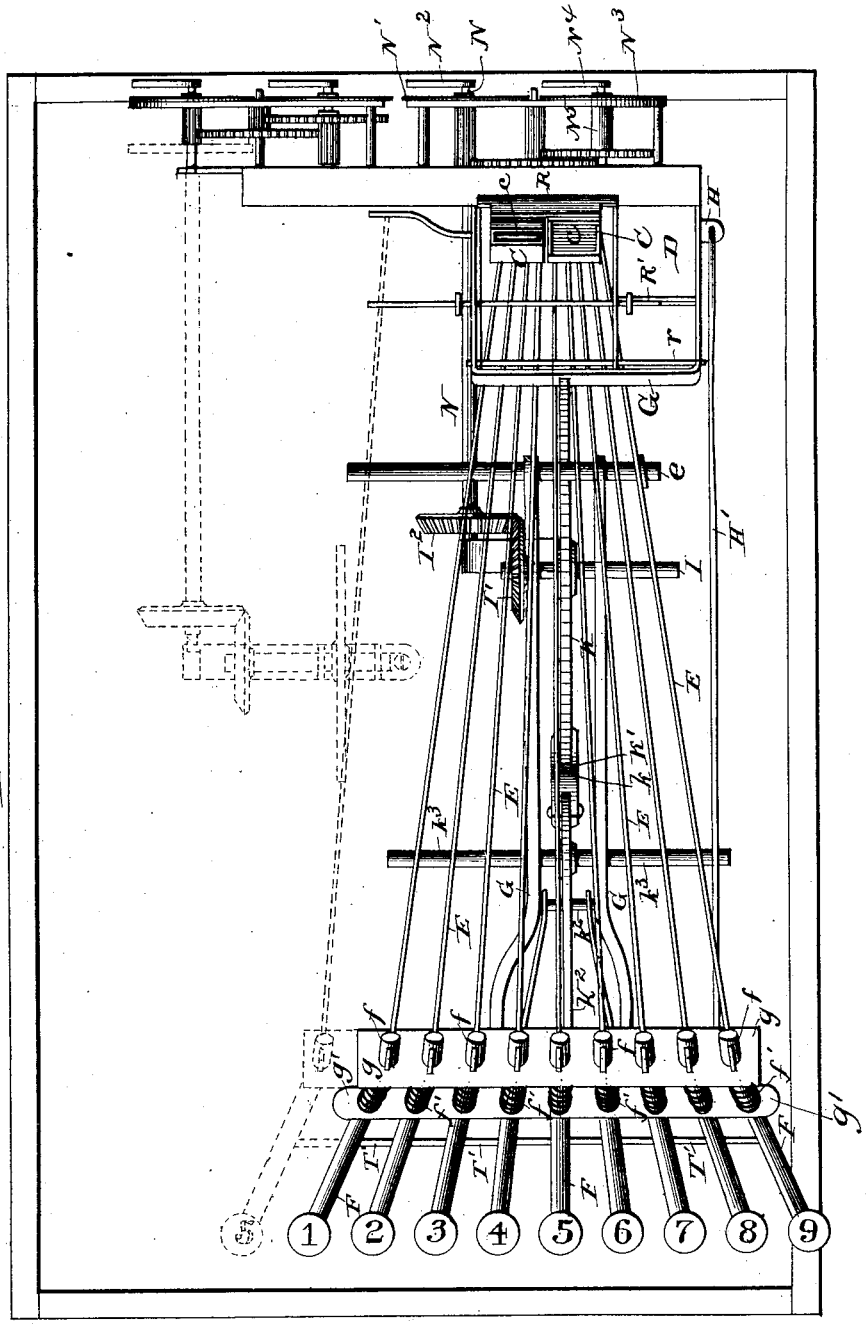
Figure 3:
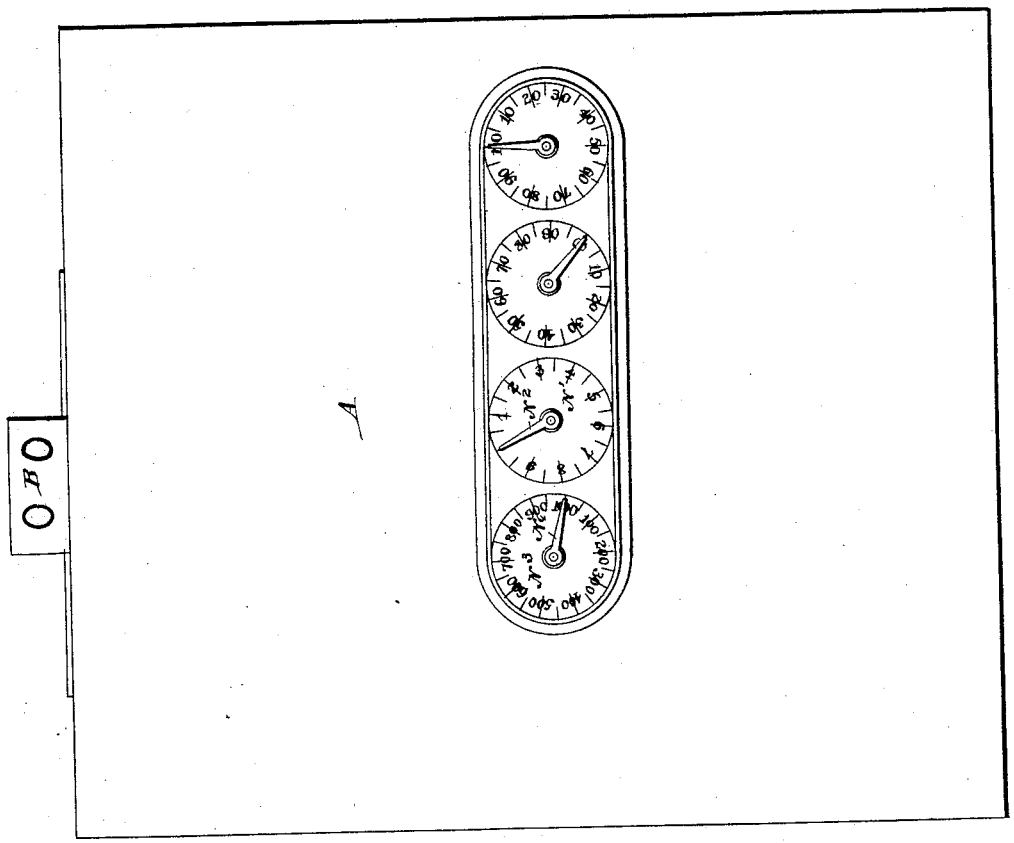

Figure 1 is a vertical longitudinal section of the machine combined with a desk. Fig. 2 is a plan view thereof, the desk being shown in section, so as to expose the machine. Fig. 3 is a front elevation of the same. Fig. 4 is a rear elevation of the machine detached from the desk. Fig. 5 is a vertical cross-section on line $x\,x$ of Fig. 1. Fig. 6 is a vertical cross-section on line $y\,y$ of Fig. 1. Figs. 7 to 10 are detail views of detached portions of the machine.

The same letters of reference indicate identical parts in all the figures.

The machine illustrated is combined with a desk, A, in the interior of which the major portion of the mechanism is arranged. On the ink-strip A' of the desk is erected a permanent stationary sign, B, on the front face of which there are marked as many ciphers in a row as there are groups of digits used in the machine. In the present example I have shown only one full group of digits, running from 1 to 9, intended to represent tens, and only a single digit representing one of the units—namely, the digit 5—so that by the machine illustrated amounts ranging from five up to ninety-five cents may be indicated as received, and also recorded and registered, the machine being capable only of indicating receipts of five cents and multiples thereof, the recording and registering devices being, however, so constructed as to record and register receipts of five cents and multiples thereof up to any sum. For some purposes, where nothing less than five cents and only multiples thereof up to ninety-five cents are received at one time, the machine illustrated would fully answer the requirements; but where sums ranging from one cent up to, say, nine hundred and ninety-nine dollars and ninety-nine cents are received the machine will be provided with a full set of digits for the units, tens, hundreds, thousands, and ten thousands, making in all five full groups. Each digit of a group is marked on a sign-plate, $c$, and each group of digit-signs is arranged in a tube, C, one behind the other and just in advance of the cipher-sign B in line with one of the ciphers thereon. In the normal condition of the machine all the digit-signs are sunk below the top of the ink-strip A', so that no figures but the ciphers are exposed to view. A slot, $a$, is formed in the ink-strip of the desk in front of the cipher-sign B, through which slot any one or more of the digit-signs may be projected for exposure to view temporarily by covering the particular cipher behind it on the sign B. Each digit-sign $c$ is fixed to or constructed with an independent upright stem, $c'$, fitted in suitable eyes in the guide-plates D and D', and encircled by a spiral spring, $c^2$, located between the under side of one of the guide-plates and a cross-pin of the stem, so that the spring will have a tendency to hold the digit-sign in a retracted position. In order to economize space, these spiral springs $c'$ are arranged alternately under the guide-plate D and the guide-plate D'. Each digit-sign may be independently projected by an independent lever, E, fulcrumed on the main frame G of the mechanism at $e$, there being as many levers E as there are digit-signs.

One end of this lever projects through a vertical slot, $c^3$, in the stem of the digit-sign. The other end is attached to the long leg $f$ of a key, F. The long leg $f$ of each key is guided into holes in the frame-bars $g$ and $g'$, and is encircled by a spiral spring, $f'$, between the frame-bar $g'$ and a cross-pin, $f^2$, passed through said leg, the said spiral spring tending to move the key up, so as to depress the end of the lever E engaging the slot in the stem of the digit-sign. The keys are bent, as shown best in Fig. 1, so that their upward movement, under the action of the spiral spring $f'$, is limited by the horizontal portion of the key bringing up against the frame-bar $g'$. The several keys F project up through the key-board $A^2$ of the desk, so that they may be conveniently depressed by the cashier to throw up or project one or more digit-signs for the purpose of indicating the amount of money received by him from a customer. When the digit-signs are retracted, the upper edges of the slots $c^3$ in their stems will bring up against the top edges of the levers E. On depressing a key, F, the lever E connected therewith will lift its appropriate digit-sign against the stress of the spring $c^2$. In order that the digit-sign so lifted may be retained in its lifted or projected position, the lower end of its stem $c'$ is caused by its own elasticity to spring over upon a bracket, $c^4$, so as to be supported upon the same until it is shoved off from it, the lever E being in the meanwhile returned to its normal position by the recoil of the spiral spring $f'$, the slot $c^3$ in the stem of the digit-sign being properly elongated to admit of this independent return movement of the lever E. A slide, $c^5$, is mounted on the bracket $c^4$, near its front edge and extends alongside one group of stems $c'$. This slide readily recedes on the bracket under any lateral pressure brought to bear against its outer edge by any one of said stems, moving back to allow the stem to spring over upon the bracket. In moving back the slide $c^5$ is brought in contact at about its center with a projection on a lever, H, which is pivoted on the bracket. This lever is connected to a rod, H', which passes through the rear side of the desk, just above the key-board, and carries at its outer end a knob, $h$, by which it may be conveniently pulled to turn lever H, for the purpose of pushing the slide $c^5$ to the outer edge of the bracket, and push off from it the stem of any digit-sign resting upon it at the time, thus causing the falling or retraction of such digit-sign. A single pull-rod, H', is used to operate all the slides $c^5$ of the different groups of digit-signs, a separate slide and lever being provided for each group of digit-signs. To effect a simultaneous operation of all the slides, the slide of the first group is connected with or placed in such relation to the lever operating the slide of the next group that in pushing the first slide to the edge of the bracket said first slide will turn the lever of the slide of the next group, pushing it also to the edge of the bracket, and so on through all the groups. There being but a single unit digit-sign in the machine illustrated, the slide is omitted and the lever so arranged as to perform the function of the slide for that unit digit-sign.

The machine both records and registers the amount received by the same movement of the keys by which the digit-signs are projected to indicate to the customer the amount so received. The register consists of wheel-work, dials, and hands. The recorder is a rotary marker or perforator for marking a ribbon of paper or other material as it is fed along by such marker or perforator. Both these recording and registering devices are operated by the shaft I of the ratchet-wheel K, constructed with one hundred teeth. The ratchet-wheel is moved stepwise by the pawl K', pivoted to the lever $K^2$, and held in contact with the teeth of the ratchet-wheel by a spring, $k$. Lever $K^2$ is fulcrumed on the frame G, and is combined with spring $K^3$, the stress of which tends to throw it up so as to hold its return-arm $k'$ in contact with a pinion, $k^2$, on the main frame. Lever $K^2$ is provided with a horizontal cross-bar, $k^3$, of sufficient length to extend across one whole group of levers, E E, being located at some distance below the same. The levers E are provided with downwardly-projecting arms E', vertically above the cross-bar $k^3$ of the lever $K^2$. The arms E' are graduated in length, the arm on the lever which operates the digit-sign marked with the digit 9 being the longest and the arm of the lever which operates the digit-sign marked with the digit 1 being the shortest. In projecting the digit-sign carrying the digit 9 the lever $K^2$ will be depressed so far as to turn the ratchet-wheel K a distance equal to nine of its teeth. In projecting the digit-sign carrying the digit 8 the lever K will be depressed so far as to turn the ratchet-wheel a distance equal to eight of its teeth, and so on through the series, the projection of the digit-sign carrying the digit 1 causing a movement of the ratchet-wheel K equal to the length of one of its teeth. A pawl, L, is used to prevent the return movement of the ratchet-wheel K, and a brake, M, presses against said ratchet-wheel to prevent its movement beyond that imparted to it by the action of the pawl K'. The wheel-work of the dial-register, which in this instance is placed in front of the desk, is driven by a bevel-wheel, I', on one end of the shaft I of the ratchet-wheel K. This bevel-wheel drives the corresponding bevel-wheel, $I^2$, on the elongated shaft N of the dial-register. Shaft N projects at its outer end through the dial N', and is provided with a hand, $N^2$. The dial N' has one hundred divisions, and since it is operated by the tens group of digit-signs each division represents ten cents in this instance, and the whole dial will register up to ten dollars. This dial N' is supplemented by a second dial, $N^3$, and hand $N^4$, the latter being secured to the shaft $N^5$, so geared down to the shaft N that every full revolution of the latter shaft will effect the one-hundredth of a revolution of the shaft $N^5$. Dial $N^3$ has one hundred divisions, and each division represents ten dollars.

Each group of digit-signs will be provided with a similar dial-register, if such register be used, the dials of the respective registers being suitably divided and marked, so that by taking the separate amounts registered on the respective dials and adding all the amounts together the entire amount of money received by the cashier may be ascertained at any time. The dials are mounted frictionally on the shafts, so that they may be turned to bring the zero-mark in line with the hand.

For recording the receipts upon a ribbon of paper I fix a wheel, O, on the end of the shaft I of ratchet-wheel K. Wheel O has one hundred saw-teeth around its periphery, also ten equidistant points, $o$, in a different plane, and another point, $o'$, opposite one of the points $o$, in a still different plane. The wheel O is thus capable of making three lines of marks or perforations on a ribbon of paper fed along by it over a rubber-sheathed counter-roller, P. Wheel O being attached in this instance to the ratchet-wheel K of the tens group, each mark made by the saw-teeth would represent the receipt of ten cents, each mark made by the points $o$ would represent the receipt of one dollar, and each mark made by point $o'$ would represent the receipt of ten dollars. The ribbon of paper will be wound on a reel, and whatever is unwound by the wheel O will fall into the bottom of the desk or case inclosing the machine. When such a rotary marker or perforator is used for recording the sums of money received, every ratchet-wheel K will be combined with such a marker or perforator and a separate ribbon, and to ascertain the whole amount recorded by the machine the sums recorded on the several ribbons must be added together.

In order to compel the cashier to operate the pull-rod H' for the purpose of retracting the exposed digit-signs after each receipt of money, and before receiving the next sum, I provide a bell, S, which is struck to give an alarm or signal by the action of lever H when it is turned to push the slide $c^5$ to the edge of the bracket $c^4$. The cashier is required to strike this bell every time before he projects the appropriate digit-signs for indicating the next amount received.

In order to prevent the holding down of any key while another key is being depressed, (whereby the record could be defrauded,) I provide a guard which compels the cashier to release all the keys before he can expose to view the figure representing the amount of money received by him from a customer. For this purpose I prefer to use a shield, R, pivoted at $r$ to the main frame G, and provided with a downwardly-projecting yoke, R', the lower horizontal bar of which extends across all the levers E used in the machine, and is resting upon or is in very close proximity to the top edge of such levers when they are in their normal positions. (Shown in Fig. 1.) The shield R is arranged in front of the tubes C of the digit-signs, and is adapted to be projected through the slot $a$ in the desk. While the levers E remain in their normal position the shield R will be retracted, so that it does not project through slot $a$; but when any one of the levers E is moved by the depression of its key a distance which would be sufficient to turn the ratchet-wheel K a distance equal to the length of one of its teeth, in that case shield R will be projected far enough to cover the cipher-sign B and any digit-sign that may be in front of it. Hence so long as any one key is held down, even part way only, the shield R will be projected so that no figures can be seen, and to uncover the figures requires the release of every key and the return of every lever E to its normal position. In lieu of this shield R means such as shown in Fig. 4 may be used, consisting of a shaft or bar, T, upon which are strung blocks or disks T', the aggregate length of which is less than the length of the shaft upon which they are strung by the thickness of one of the stems of the keys F. These blocks T' are located directly under the keys, and no key can be depressed without passing in between two adjacent blocks. When one key is thus depressed, the blocks on either side of it are pressed so closely together that no other key can be depressed at the same time.

In practice the key to the desk A will be carried by the proprietor of the store, so that the record cannot be tampered with.

I desire it to be understood that I do not limit myself, primarily, to the details of construction hereinbefore described, because such details may be greatly varied without changing the essential character of the machine.

While the machine is more especially designed for the purposes of indicating and recording and registering cash receipts, it is obvious that it may be used as well for indicating and recording and registering disbursements, in which case the digit-signs and cipher-sign might be reversed, so as to face the cashier. It may also be used for showing numbers for other purposes.

I believe that I am the first to combine a group of independent digit-signs ranged behind one another with another figure-sign—such as a cipher-sign—or with another similar group of digit-signs adapted to be exhibited by the side of any sign of the first group to exhibit a combination of figures. My first claim is designed to cover this feature as broadly as is possible within legal bounds.

The term "accounting device," used in the second claim, is to be understood as covering either a recorder or a register, or both a recorder and a register.

Having thus described my invention, what I claim is—

1. A group of separately-movable digit-signs ranged behind one another, in combination with another figure sign or group, substantially as before set forth.

2. The combination, substantially as before set forth, of a group of separately-movable digit-signs ranged behind one another, with another figure sign or group and an accounting device.

3. The combination, substantially as before set forth, of a digit-sign, a spring for retracting it, a key-lever for projecting it, a bracket for supporting the stem of the projected digit-sign, and means, such as described, for pushing said stem from the bracket to cause the retraction of the digit-sign.

4. The combination, substantially as before set forth, of a stationary cipher-sign and a group of independently-movable digit-signs.

5. The combination, substantially as before set forth, of a digit-sign, a platform for supporting it when exposed, a slide for moving it from the platform, a lever for operating the slide, and a bell which is struck by the action of the lever in moving the slide.

6. The combination, substantially as before set forth, of a group of independent key-levers, a corresponding group of separately-movable digit-signs, and a guard which compels the release of all the key-levers before the figures representing the amount received can be exposed to view.

In testimony whereof I affix my signature in presence of two witnesses.

WM. L. HORNE.

Witnesses:
   THEO. MUNGEN,
   EWD. T. WALKER.